(12) United States Patent
Mansour et al.

(10) Patent No.: US 8,534,143 B2
(45) Date of Patent: Sep. 17, 2013

(54) LOW-POWER FORCE SENSOR

(75) Inventors: Adel B. Mansour, Mentor, OH (US); Jeffrey M. Melzak, Beachwood, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 461 days.

(21) Appl. No.: 12/833,385

(22) Filed: Jul. 9, 2010

(65) Prior Publication Data
US 2011/0079092 A1    Apr. 7, 2011

Related U.S. Application Data

(60) Provisional application No. 61/248,069, filed on Oct. 2, 2009.

(51) Int. Cl.
*G01L 1/04*    (2006.01)
*G01L 1/00*    (2006.01)
*G01F 1/28*    (2006.01)

(52) U.S. Cl.
USPC ............... 73/862.634; 73/562.639; 73/861.71

(58) Field of Classification Search
USPC ............ 73/862.634, 862.639, 861.71, 861.75
See application file for complete search history.

(56) References Cited

U.S. PATENT DOCUMENTS

| | | | | |
|---|---|---|---|---|
| 3,298,230 A * | 1/1967 | Stover | | 73/861.74 |
| 3,340,733 A * | 9/1967 | Lasher | | 73/861.74 |
| 3,722,264 A * | 3/1973 | Talmo et al. | | 73/769 |
| 4,625,565 A * | 12/1986 | Wada et al. | | 73/861.74 |
| 5,279,162 A * | 1/1994 | Takebe et al. | | 73/726 |
| 5,663,508 A * | 9/1997 | Sparks | | 73/861.71 |
| 5,747,703 A * | 5/1998 | Plisson et al. | | 73/861.77 |
| 6,212,958 B1 * | 4/2001 | Conley | | 73/861.74 |
| 6,952,968 B2 * | 10/2005 | Kozawa et al. | | 73/756 |
| 7,259,574 B2 * | 8/2007 | Shrikrishna | | 324/681 |
| 7,921,726 B2 * | 4/2011 | Ellegood | | 73/740 |
| 7,958,790 B2 * | 6/2011 | Gleghorn et al. | | 73/862.632 |
| 2009/0005744 A1 * | 1/2009 | Karpowicz et al. | | 604/290 |
| 2009/0241660 A1 * | 10/2009 | Nakano et al. | | 73/204.26 |
| 2012/0064616 A1 * | 3/2012 | Liu | | 435/288.7 |

* cited by examiner

*Primary Examiner* — Lisa Caputo
*Assistant Examiner* — Jonathan Dunlap
(74) *Attorney, Agent, or Firm* — Renner, Otto, Boisselle & Sklar, LLP

(57) ABSTRACT

A force sensor utilizing force sensing element to generate an output signal that is commensurate with the force applied to the sensor. The force sensor includes a support element coupled to a resilient deflectable portion and at least one pivotable arm portion extending from the resilient deflectable portion; and a force sensing element supported by the base element and operably coupled to the at least one pivotable arm portion, wherein the force sensing element outputs an output signal that is proportional to a force applied to the at least one pivotable arm portion. The force sensor may be used a mass flow meter by coupling a fluid passage to the force sensor. The structure of the force sensor makes use of mechanical amplification to greatly increase the sensitivity of the sensor.

28 Claims, 7 Drawing Sheets

LOW-POWER FORCE SENSOR

CROSS-REFERENCE TO RELATED APPLICATIONS

The present application claims the benefit of the filing date of U.S. Provisional Application Ser. No. 61/248,069 filed Oct. 2, 2009, which is incorporated herein by reference in its entirety.

FIELD OF THE INVENTION

The invention relates to a force sensor that is adaptable to a wide range of applications, and more particularly to a force sensor that utilizes a smart sensing element to facilitate measurement of forces applied to the sensor.

BACKGROUND

There has been an increased demand for sensors capable of precisely detecting physical quantities such as force, fluid flow rates, etc. There are many drawbacks with conventional sensors, e.g., complex sensor designs, requirement of expensive and sensitive electronic components, difficulty in maintaining calibration of the sensor, each sensor limited to a small number of applications, sensors are sensitive to environmental conditions, etc.

SUMMARY

The invention provides a low-power force sensor that can be used in a wide range of commercial applications including, for example, sensing force and fluid flow. The force sensor includes a resilient deflectable portion coupled to a support element. A force sensing element is coupled between the support element and the resilient deflectable portion and outputs a signal that is proportional to a force applied to the resilient deflectable portion.

The force sensor may be coupled to a fluid passageway and/or a fluid passageway may be formed in a portion of the sensor such that movement of the resilient deflectable portion applies a force on the force sensing element, which generates an output signal that is generally proportional to the applied force. In turn, the output signal may be correlated to a fluid flow through the passageway.

As a fluid flow sensor, the claimed invention may overcome many of the limitations of conventional sensors. The technology disclosed herein may be used in connection with, for example, proportional valves, on/off valves, and fluid pumps. The technology also enables online control of process fluids to serve a large number of applications. Exemplary markets include, for example: measurement and control of mass flow rate for industrial process fluids, such as water and lubricants; coolant flow for high power electronic; equipment and continuous metering of fuel in industrial boilers, environmental sensors, regulatory sensors, fuel systems; nozzles for land-based and aero gas turbine engines, etc.

One aspect of the invention relates to a force sensor including: a support element having a base portion coupled to a resilient deflectable portion and at least one pivotable arm portion extending from the resilient deflectable portion; and a force sensing element supported by the base element and operably coupled to the at least one pivotable arm portion, wherein the force sensing element outputs a signal that is proportional to a force applied to the at least one pivotable arm portion.

Another aspect of the invention relates to a method for measuring force, the method including: receiving force by at least one pivotable arm extending from a resilient deflectable portion; generating an output signal from a force sensing element supported by the support element and operatively coupled to the at least one pivotable arm through a resilient deflectable element, wherein the force sensing element outputs an output signal that is proportional to a force applied to the at least one pivotable arm portion.

Another aspect of the invention relates to a method for measuring fluid flow, the method includes: receiving fluid at a fluid inlet port of a fluid passageway, wherein the fluid inlet port is coupled to a pivotable arm extending from a resilient deflectable portion of a support element; routing the received fluid from the fluid input port through a fluid passageway for output through a fluid output port; and generating an output signal from a force sensing element supported by the support element and operatively coupled to the at least one pivotable arm, wherein the output signal generated by the force sensing element is proportional to a net force associated with a flow of the received fluid from the fluid input port through the fluid passageway and output through the fluid output port.

Another aspect of the invention relates to a force sensor including: a support body, a resilient deflectable structure and at least one arm pivotably mounted to the resilient deflectable structure; and a force sensing element operatively coupled between the resilient deflectable structure, the support body and the at least one arm in such a manner to generate sufficient leverage between the force sensing element and the at least one arm to generate an output signal within a suitable range that corresponds to the applied force without electrical amplification of the output signal.

Another aspect of the invention is a force sensor system that includes: a support body and at least one arm pivotably mounted to the support body; a fluid passageway coupled to the at least one arm; and a remote sensor that measures position of the fluid passageway and generates a corresponding output signal.

Another aspect of the invention relates to a force sensor system including: a support body and at least one arm pivotably mounted to the support body; a fluid passageway coupled to the at least one arm; and a remote sensor that measures position of the fluid passageway and generates a corresponding output signal.

One benefit of the claimed invention is mechanical amplification of force, which serves to increase the sensitivity of the sensor.

Further features of the invention will become apparent from the following detailed description when considered in conjunction with the drawings.

DETAILED DESCRIPTION

Figure 1A:
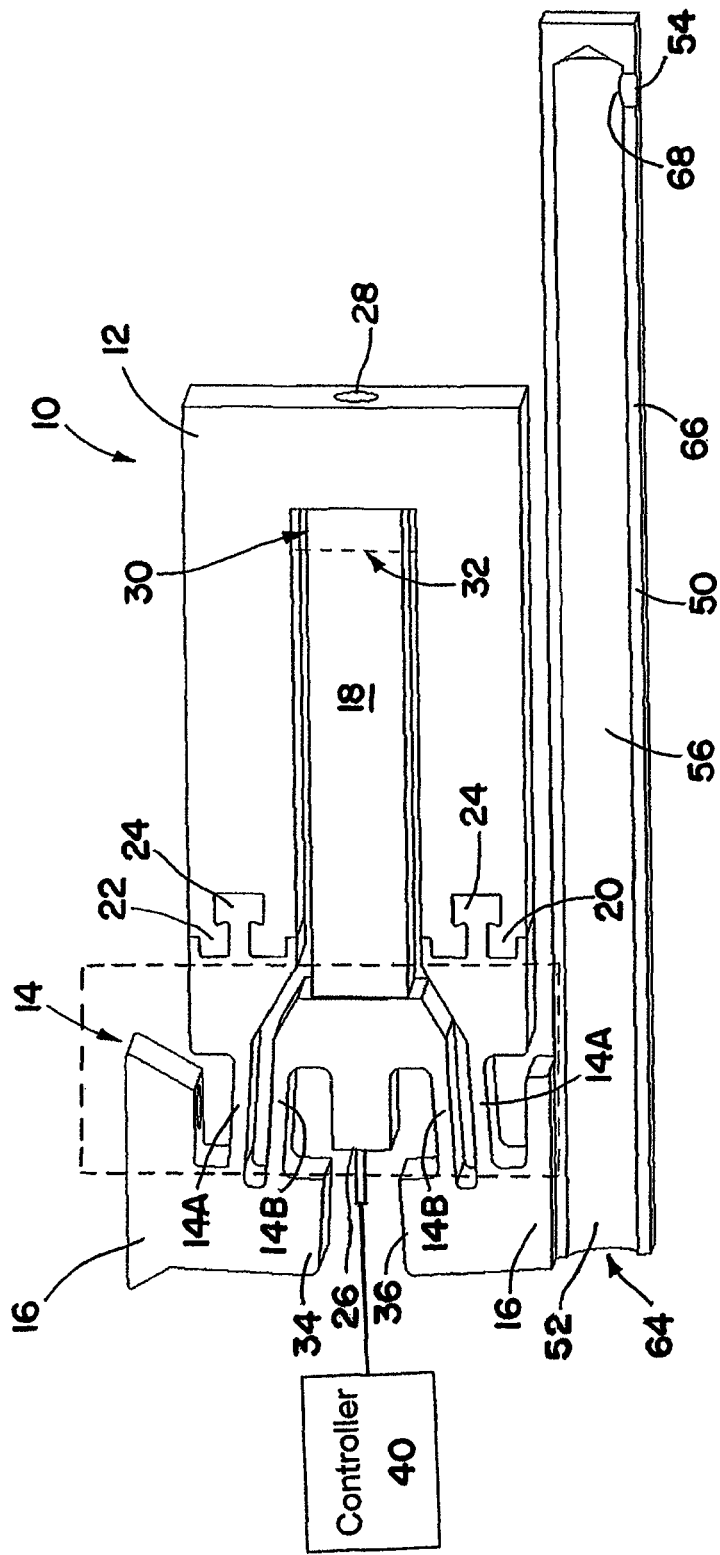
FIG. 1A is a perspective view of an exemplary force sensor in accordance with aspects of the present invention.

In the figures, elements having an alphanumeric designation may be referenced herein collectively or in the alternative, as will be apparent from context, by the numeric portion of the designation only. Further, the constituent parts of various elements in the figures may be designated with separate reference numerals that shall be understood to refer to that constituent part of the element and not the element as a whole. General references, along with references to spaces, surfaces, dimensions, and extents, may be designated with arrows. Furthermore, features or aspects of one figure may be incorporated in other figures.

Figure 1B:
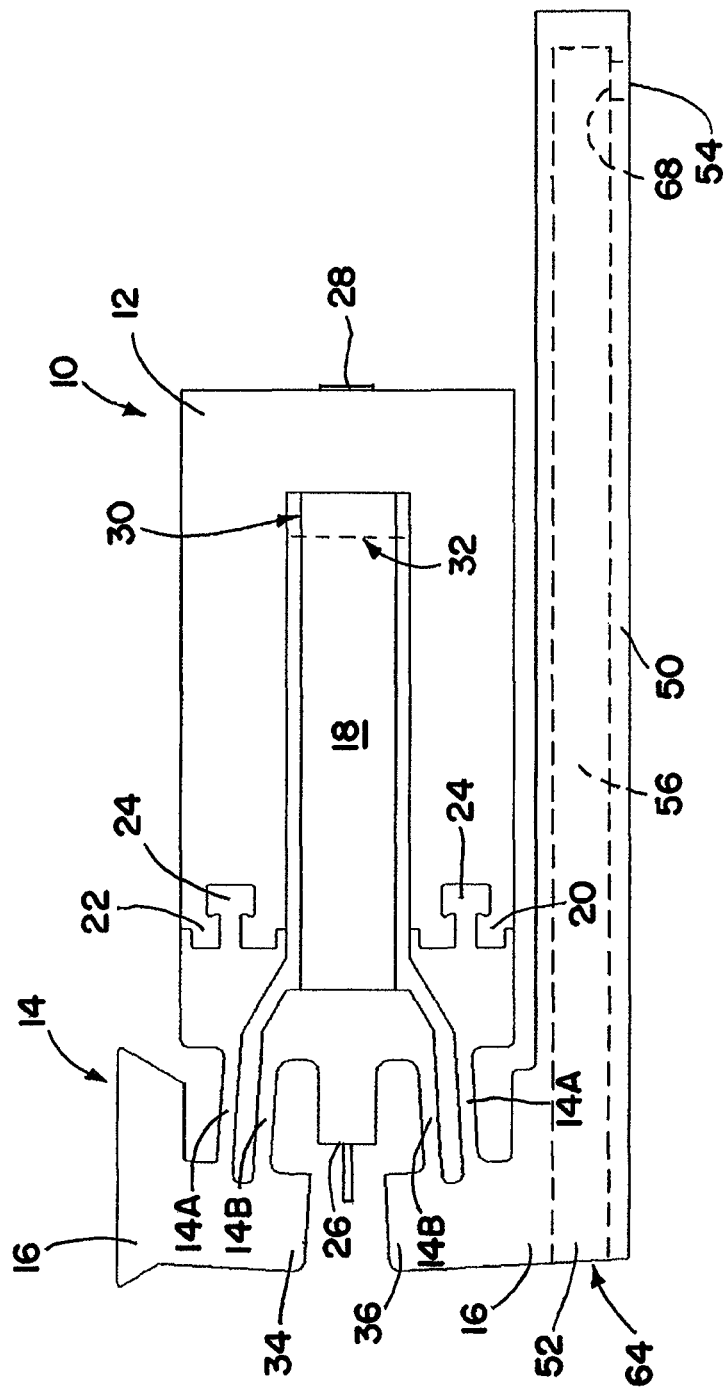
FIG. 1B is a side elevational view of FIG. 1A.

Referring now to FIGS. 1A and 1B, an exemplary force sensor 10 in accordance with aspects of the present invention is illustrated. The force sensor 10 generally includes: a support element 12 coupled to a resilient deflectable portion 14, at least one pivotable arm portion 16 extending from the resilient deflectable portion 14 and a force sensing element 18 supported by the support element 12 and operably coupled to the at least one pivotable arm portion 16. The force sensing element 18 outputs an output signal that is proportional to a force applied to the at least one pivotable arm portion 16.

The support element 12 is generally rigid and non-flexible. The support element 12 may have a first end 20 and a second end 22 that couples the support element 12 to at least one of the resilient deflectable portions 14. Preferably, the support element 12 is a unitary, integral, single-piece monolithic body. One of ordinary skill in the art will readily appreciate that although a support element having two separate couplings to the resilient deflectable portions are shown, the support element may be formed integrally with the resilient deflectable portion or the support element may be coupled to the resilient deflectable portion by a single coupling.

At least one resilient deflectable portion 14 is coupled to the support element 12. The resilient deflectable portion 14 may be coupled to the support element 12 in any desired manner. The resilient deflectable portion 14 may be coupled to the support element by a securing mechanism 24, which may formed by a mechanical linking structure formed for mating engagement by an end (e.g., 20, 22) of the support element 12 and a portion of the resilient deflectable portion 14, for example. Suitable securing mechanism 24 may be adhesives, resins, interlocking mechanical structures, etc. In another embodiment, the at least one deflectable portion 14 may be cast or otherwise formed integrally with the support element 12. For purposes of this disclosure, the phrase "coupled to" shall mean the elements may be integrally formed and/or joined together with a securing mechanism.

The resilient deflectable portion 14 may include one or more portions 14A, 14B, for example. The resilient deflectable portion 14 may also include a single portion that couples the support element to the pivotable arm portion 16 and to a force transfer element 26, as described below. The resilient deflectable portion 14, in normal operation, is operable to deflect a certain amount and return to its initial position, without permanent deformation. The resilient deflectable portion 14 generally functions as a hinge to operably link the support element 12 and the force sensing element 18.

As shown in FIGS. 1A and 1B, one portion 14A of the resilient deflectable portion may have one end coupled to the support element 12 and an opposing end coupled to a pivotable arm portion 16. Another portion 14B of the resilient deflectable portion may have one end coupled to the pivotable arm portion 16 and an opposing end coupled to the force transfer element 26. As such, one end of portions 14A and 14B may be coupled to different structures (e.g., support element 12, force transfer element 26). Another end of the portions 14A and 14B may be coupled to a common structure (e.g., pivotable arm portion 16).

The force sensor 10 may include one or more pivotable arm portions 16 that pivot about the resilient deflectable portion 14. The force sensor 10 may include two pivotable arm portions 16. The pivotable arm portions 16 are configured for movement relative to one another, such that movement of one pivotable arm portion 16 induces a force in the force sensing element 18, as transmitted through the resilient deflectable portion 14.

The force sensing element 18 may be any type of sensing material in which a stimulus (e.g., a force, magnetic field, etc.) is applied and the force produces or results in a corresponding output signal (e.g., an electrical signal, a magnetic signal, an optical, etc.). Exemplary force sensing elements include piezoelectric materials, piezoresistive materials and magnetorestrictive materials. As one skilled in the art will readily appreciate, such materials transform energy of a mechanical input or magnetic input into an electrical output. More specifically, when a force and/or pressure is applied to a piezoelectric material, it causes a mechanical deformation and a displacement of electrical charge. Such electrical charge is highly proportional to the applied pressure. Thus, relative movement of one or more pivotable arm portions 16 generates mechanical stress on the force sensing element 18 when the force sensing element is a piezoelectric force sensing element. This mechanical stress may be correlated to a force. When the force sensing element 18 is a piezoresisitive force sensing element, the electrical resistance of the material changes due to applied mechanical stress in highly linear manner that may be correlated to a force. When the force sensing element 18 is a magnetorestrictive material, the material changes shape or dimensions when subjected to a magnetic field. One of ordinary skill in art will appreciate that any such "smart" material may be used in accordance with aspects of the present invention.

Figure 1C:
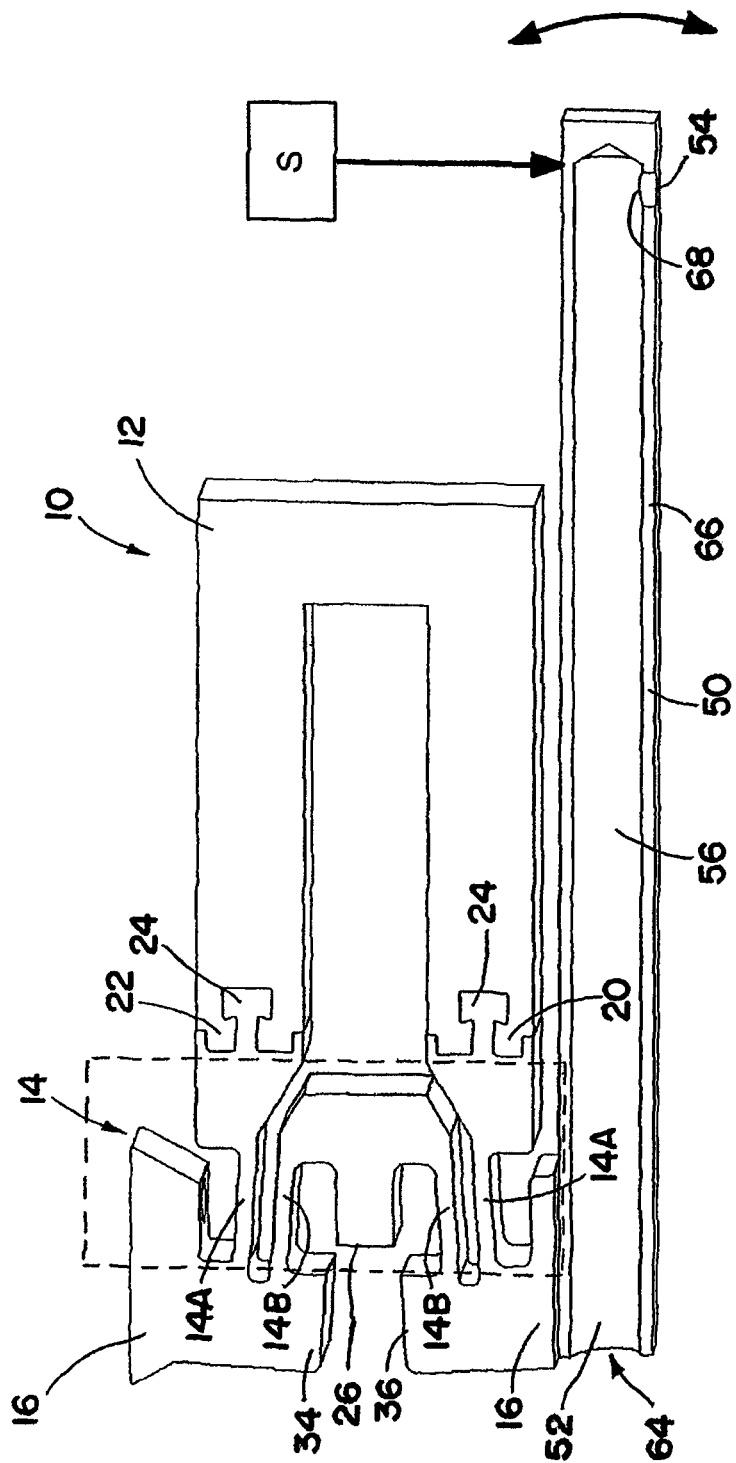
FIG. 1C is an exemplary system in accordance with aspects of the present invention.

Other sensors that may be used in accordance with aspect of the present invention are optical sensors and/or proximity sensors. For example, referring to FIG. 1C, a sensor (S) may be positioned to measure deflection of the fluid passageway 50. In one embodiment, the sensor (S) measures the displacement of fluid passageway 50 by using an optical sensor, an infrared sensor or other suitable sensor. The amount of displacement of the fluid passageway 50 may be correlated to a fluid flow as discussed with respect to the force sensing element 18.

The support element 12 and the resilient deflectable portion 14 are configured to provide mechanical amplification of the force imparted on the at least one pivotable arm 16. Such mechanical amplification results in an electrical amplification of the output signal of the force sensing element 18. The mechanical amplification serves to greatly increase the sensitivity of the force sensor 10. For example, applying a force of seven pounds to an un-amplified piezo element will induce a change in length of less than 0.001 inch. Applying the same magnitude force to an amplified piezo element will induce a change in displacement of approximately 0.100 inch at the end of the pivotable arm 16. Accordingly, a given force results in an output signal, which is proportional to displacement that is 50-100 times larger for the amplified versus non-amplified piezo sensing element. Conversely, much smaller loading forces can be measured by the mechanically amplified piezo sensing element than conventional piezo sensors. This advantage, in turn, simplifies the readout electronics. A further advantage over other types of force sensors is that the force sensing element 18 does not require electrical power to operate (except for the signal conditioning electronics).

As illustrated in FIGS. 1A and 1B, the force sensor element 18 is operably engaged between the support element 12 and a force transfer member 26, which is formed from the resilient deflectable portion 14 and the at least one pivotable arm portion 16. to drive the force transfer member 26 away from the support element 12 when a force is applied. The support element 12 may receive an adjustable support 28 with an adjustable seat 30 having a complementary surface to an end 32 of the force sensing element 18. The complementary surface of the adjustable seat 30 can be flat or shaped in any manner to support the force sensing element 18 in a position suitable for measuring deflection of the force transfer member 26 and/or driving and/or predictably moving the force transfer member in response to an applied force on the force sensing element 18. A force applied at least one pivotable arm portion 16 causes movement of the force transfer member 26 about the hinge created by the resilient deflectable portion 14. In turn, a corresponding output signal may be generated by the force sensing element 18, which corresponds to the applied force, for example. At least one resilient deflectable portion 14 extends between each rigid arm portion 16 and a pivotal base portion 34, 36 of each corresponding pivotable arm portion 16, and at least one resilient deflectable portion 14 extends between the corresponding base portion 34, 36 of the pivotable arm portions 16 and the force transfer member 26.

The force sensor 10 may be coupled to a controller 40, as illustrated in FIG. 1A. The controller 40 can be provided to read and record the output of the force sensing element 18. The amount of electrical charge stored by the force sensing element 18 is generally proportional to the amount of force sensed by the force sensing element 18. A measured displacement may be correlated to a force and/or a flow rate. Because of the pivotable nature of the structure of the force sensor 10, the displacement of the at least one pivotable arm 16 is generally along a curvilinear path.

One of ordinary skill in the art will appreciate that the embodiments illustrated in FIGS. 1A, 1B, 1C and 2, have components that may be machined from a single monolithic piece of metallic material for example stainless steel. Other suitable materials can include powdered metal, metallic alloys, composite materials, or a combination of metallic and composite materials. Although these materials given as examples provide excellent performance, depending on the requirements of a particular application, use of other materials for the support can be appropriate. Alternatively, some components like the pivotable arm portions can be manufactured separately from other components of the force sensor and mechanically assembled later to form the force sensor structure, for example.

The force sensor 10 may be utilized as a mass fluid flow sensor. For example, the force sensor 10 may further include a fluid passage member 50 coupled to at least one pivotable arm portion 16. The fluid passage member 50 may be formed in the at least one pivotable arm portion 16 and/or the fluid passage member 50 may be secured to the pivotable arm portion 16 in any suitable manner. For example, the fluid passage member 50 may be coupled to the pivotable arm portion 16 with a mechanical fastening mechanism, such as, one or more screws, nails, rivets, etc. and/or an adhesive fastening mechanism, such as, a pressure sensitive adhesive, an epoxy, a curing adhesive, a non-curing adhesive, and/or a joining process, such as welding, etc.

The fluid passage member 50 generally includes a fluid inlet port 52, a fluid outlet port 54 and a fluid passageway 56 between the fluid inlet port 52 and the fluid outlet port 54. The fluid inlet port 52 and the fluid outlet port 54 may be configured in any desired manner.

Figure 2:
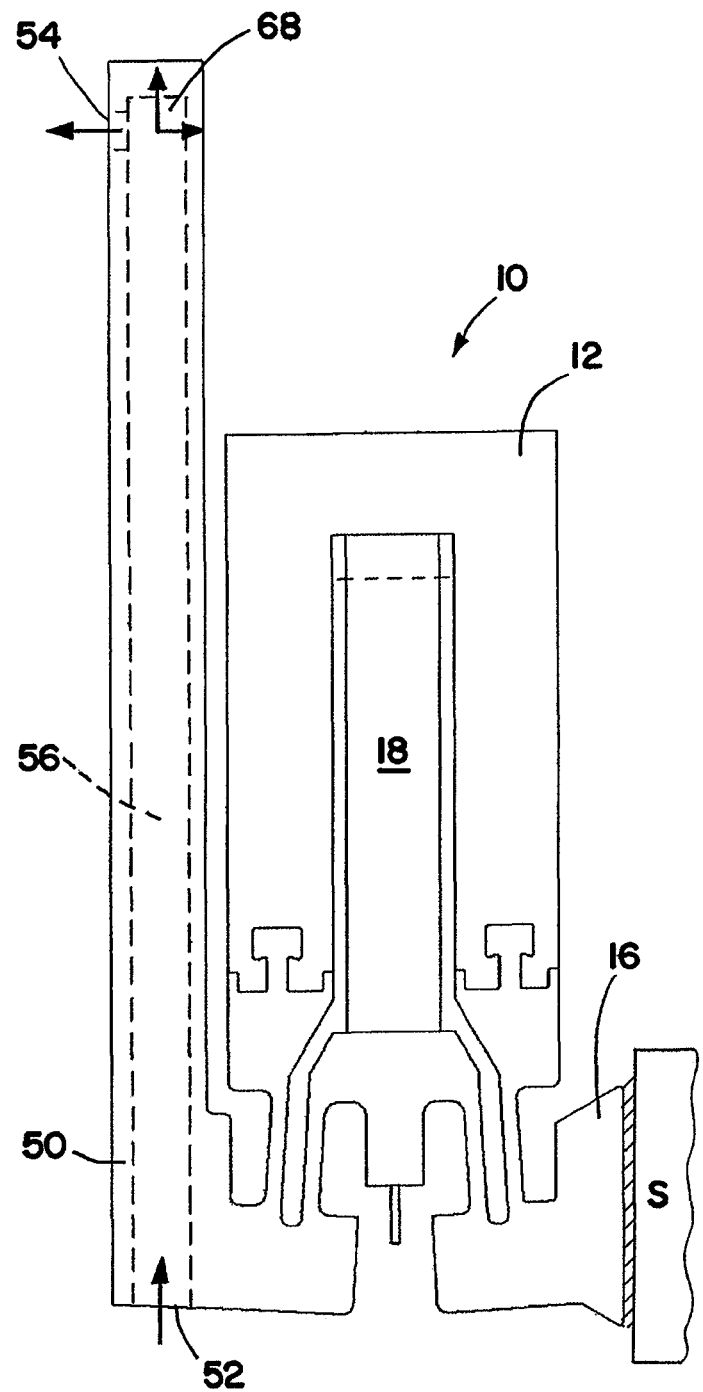
FIG. 2 is a side elevational view of the exemplary force sensor secured to a structure.

Referring to FIG. 2, the force sensor 10 may be secured by one pivotable arm portion 16 to a structure ("S"). Although the force is illustrated as being secured by one pivotable arm portion 16 to a stationary structure, one skilled in the art will appreciate that other portions of the force sensor 10 may be secured to the structure.

A fluid may be routed or otherwise forced through the fluid passage member 50. For purposes of this disclosure, a fluid may take a wide variety of forms including, for example, air, liquid, and gas. The fluid may flow through the fluid inlet port 52 through the fluid passageway 56 and out the fluid outlet port 54. The reactionary forces from fluid flowing out the fluid outlet port 54 impart a deflection of the fluid passage 50, which may be measured by the force sensing element 18. When fluid flows through the fluid passageway 56 and out the fluid outlet port 54, a force is imparted on the pivotable arm portion 16. The force is proportion to the mass flow rate. The resultant force results in deflection of the pivotable arm portion 16 and is transmitted to the force sensing element 18 via the mechanical amplification structure, induces a change in output voltage of the force sensing element 18 that is directly proportional to the applied force.

Figure 3:
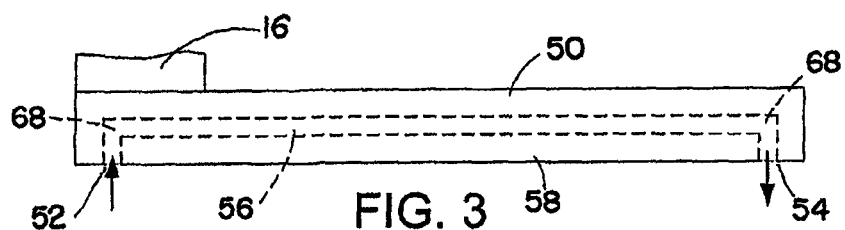
FIGS. 3-8 are exemplary cross-sectional view of fluid passageways in accordance with aspects of the present invention.
Figure 4:
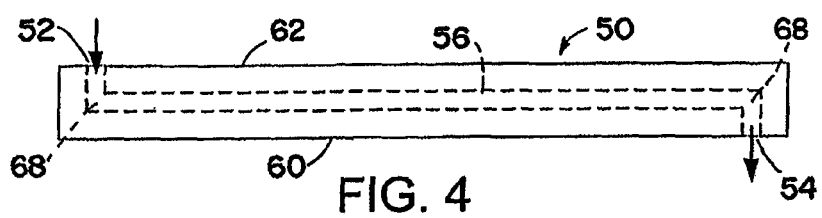

One of ordinary skill in the art will readily appreciate that the fluid passage member 50 may take a variety of forms. For example, referring to FIG. 3, the fluid inlet port 52 and the fluid outlet port 54 may be located on a common surface 58 of the fluid passage member 50. In another embodiment, the fluid inlet port 52 and the fluid outlet port 54 may be located on opposing surfaces 60, 62 of the fluid passage member 50. In yet another embodiment, illustrated in FIGS. 1A and 1B, the fluid inlet port 52 may be located on a first surface 64 and the fluid outlet port 54 may be located on a second surface 66, wherein the first surface and the second surface are orthogonal to each other.

Figure 5:
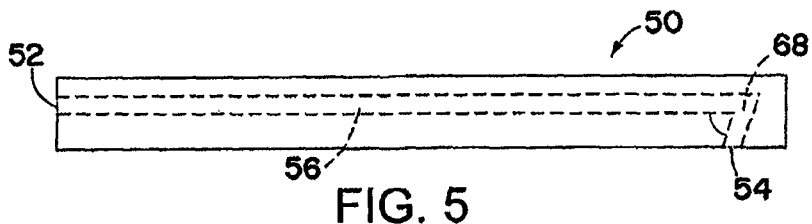
Figure 6:
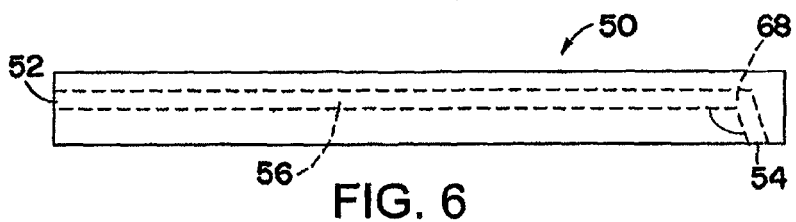

As shown in FIGS. 1A, 1B, 2, 3 and 4, the fluid passageway 56 may include at least one bend 68 having an angle of substantially about 90 degrees. Referring to FIG. 5, the fluid passageway 56 may include at least one bend 68 having an angle less than 90 degrees. Likewise, referring to FIG. 6, the fluid passageway 56 may include at least one bend 68 having an angle greater than 90 degrees. One skilled in the art will appreciate that the bend 68 generally imparts a force that may be measured by the force sensor 10. Any suitable degree of bend may be used in accordance with aspects of the present invention.

Figure 7:
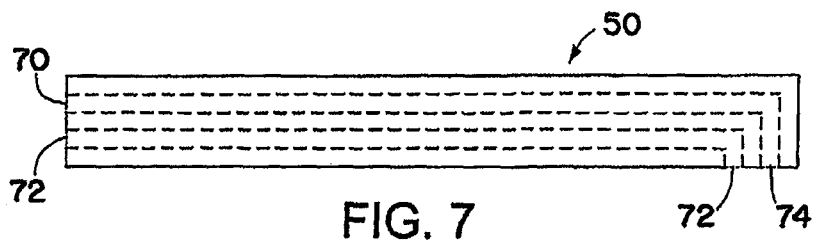
Figure 8:
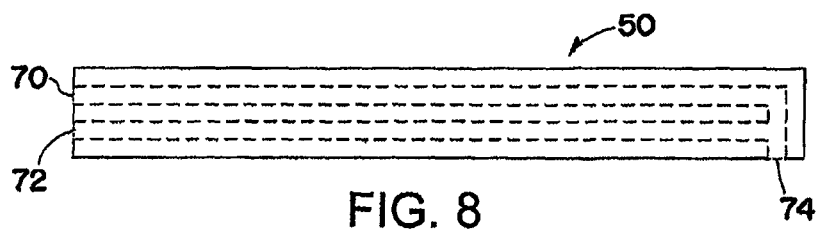

In yet another embodiment illustrated in FIGS. 7 and 8, the fluid passage member 50 may include a plurality of fluid inlet ports 70, 72. For example, the fluid inlet ports may separate fluid output ports 72, 74, as illustrated in FIG. 7. Alternatively, the flow of fluid from fluid input ports 70, 72 may converge to form a single output port 74, as illustrated in FIG. 8.

As set forth above, the force sensor 10 makes use of a highly efficient mechanical structure that magnifies the force applied to the end of the pivotable arm 16 and transmits it to the force sensing element 18, in order to provide a useful range of output. For example, the magnification may be on the order of 70×. One of ordinary skill in the art will appreciate that the specific magnification is provided for solely for purposes of illustration and in no way intended to limit the scope of the present invention.

The force sensing element 18 has high output linearity, which enables control of valves and the like. As discussed above, the force sensing element 18 makes use of mechanical amplification caused by the structure of the force sensor 10. Unlike conventional non-amplified piezo stack actuators, which can only expand a few tens of microns in response to the maximum electric field that they can withstand, the mechanical amplification integrated with the force sensing element 18 overcomes this limitation by integrating the mechanical amplifier.

As set forth above, the force sensor 10 may take the form of a mass flow sensor, as illustrated in FIGS. 1A, 1B, 1C and 2. The force sensor 10 takes advantage of the force sensitive material 18 that will generate an output voltage signal proportional to the loading force when it is placed under mechanical load. In operation, the fluid passage element 50 is coupled to a pivotable arm portion 16. When fluid flows through the fluid passageway 56, the fluid imparts a force on the at least one pivotable arm 16. The force is proportional to the mass flow rate. The resultant force is transmitted to the force sensing element 18 through the mechanical amplifier structure of the sensor 10, and induces a change in output voltage that is proportional to the force. In other words, the un-powered force sensor 10 outputs a voltage signal that tracks the mass flow rate.

Such an approach has a number of competitive advantages over existing mass flow sensors. For example, due to the mechanical amplification effect, discussed above, the sensor 10 will have both a high sensitivity and a large turndown ratio. Turndown ratio is defined as the ratio of maximum to minimum flow that the flow meter is capable of accurately measuring. Turndown ratio is a well known key performance metric.

Another advantage is that the sensor 10 may have a very small form factor. For example, in one embodiment, the sensor 10 may encompass a spatial volume of less than 1 cubic inch. This is particularly advantageous for applications where the flow sensor may be integrated into an existing component where space is at a premium.

Another advantage is that the force sensor 10 can be produced at low cost relative to competing flow meters. Furthermore, since the output of the piezo sensing element 18 is a voltage signal, if application requirements dictate the need for conditioning electronics (e.g., to produce an alternative communication protocol), an ASIC may be used, which are generally inexpensive and available off-the-shelf.

Another advantage of the sensor 10 is that it is passive, i.e., it does not need to be powered. This is a key differentiating characteristic that directly addresses the market driver of energy efficiency.

Another advantage is the force sensor's 10 quick response time (e.g., on the order of milliseconds), which may enable the sensor to measure flow transients. Conventional flow meters are unable to measure such transients.

During development of the sensor 10, basic fluid mechanics analyses were performed in order to derive the expected relationship between the mass flow rate and sensor output voltage of the piezo sensing element 18. In particular, control volume formulation of Newton's second law for non-accelerating flows was applied to the geometry of the sensor 10 along with the law of mass conservation. Assuming steady-state conditions, it can be shown that the net force on the pivotable arm portion 16 is proportional to the square of the mass flow rate.

Figure 9:
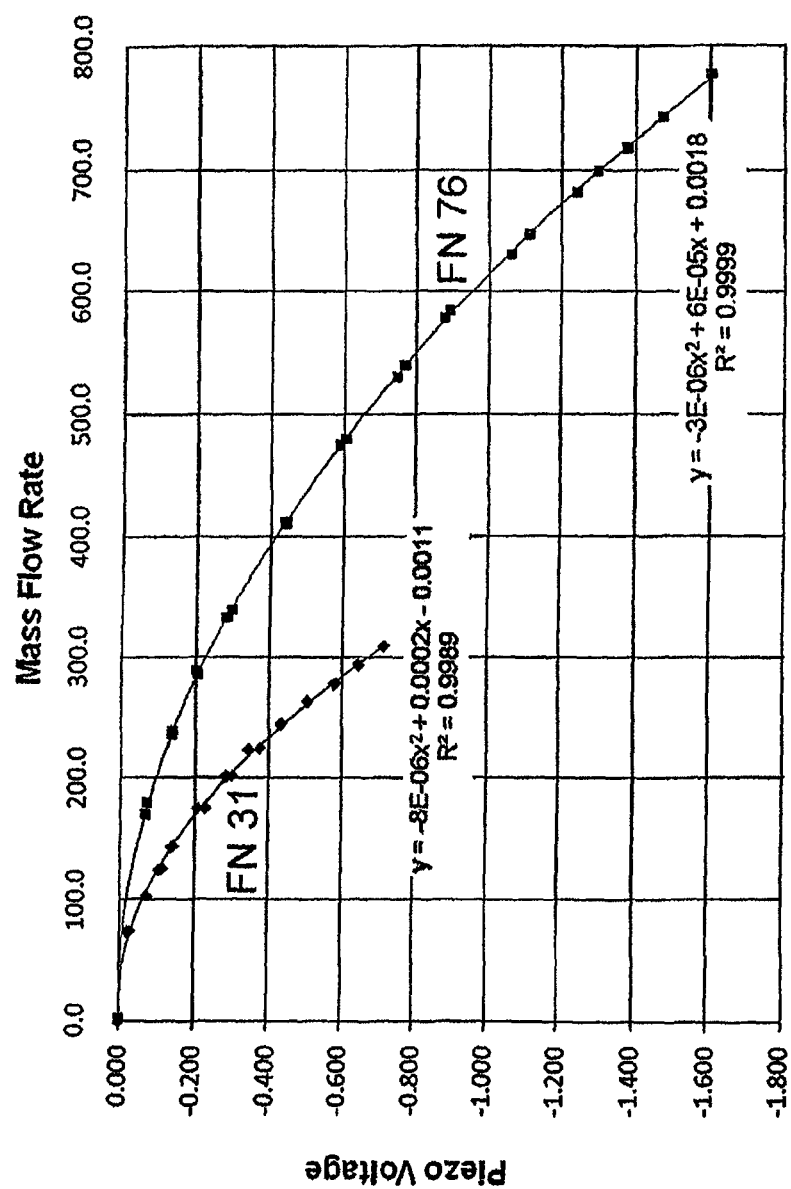
FIG. 9 is an exemplary chart that illustrates correlation of output voltage for an exemplary force sensing element as a function of flow rate.

Such analysis was then confirmed experimentally with very promising results. In the experiments, the sensor 10 was connected to an existing flow test stand that supplies MIL-PRF-7024 calibration fluid at flow rates in excess of 1,000 lbs/hr. Mass flow rate was measured using a calibrated coriolis flow meter. Sensor output was measured by reading the output voltage using a digital multimeter. The inlet pressure was changed in order to sweep through a variety of flow rates, and the sensor voltage was recorded for each setting. FIG. 9 illustrates sensor output voltage (in Volts) as a function of mass flow rate (in lbs/hr) for two different flow channel geometries (e.g., flow number (FN) 31 and FN 76). The symbols represent experimental data points, while the lines represent curve fits for each dataset. It should be noted that the sensor response is quadratic—as expected—and furthermore that the least squares curve fit parameters are extremely high (R-squared values greater than 0.998), which demonstrates a response nearly identical to that predicted by theory. Note that the output voltage was measured directly, with no signal conditioning electronics in line.

Figure 10:
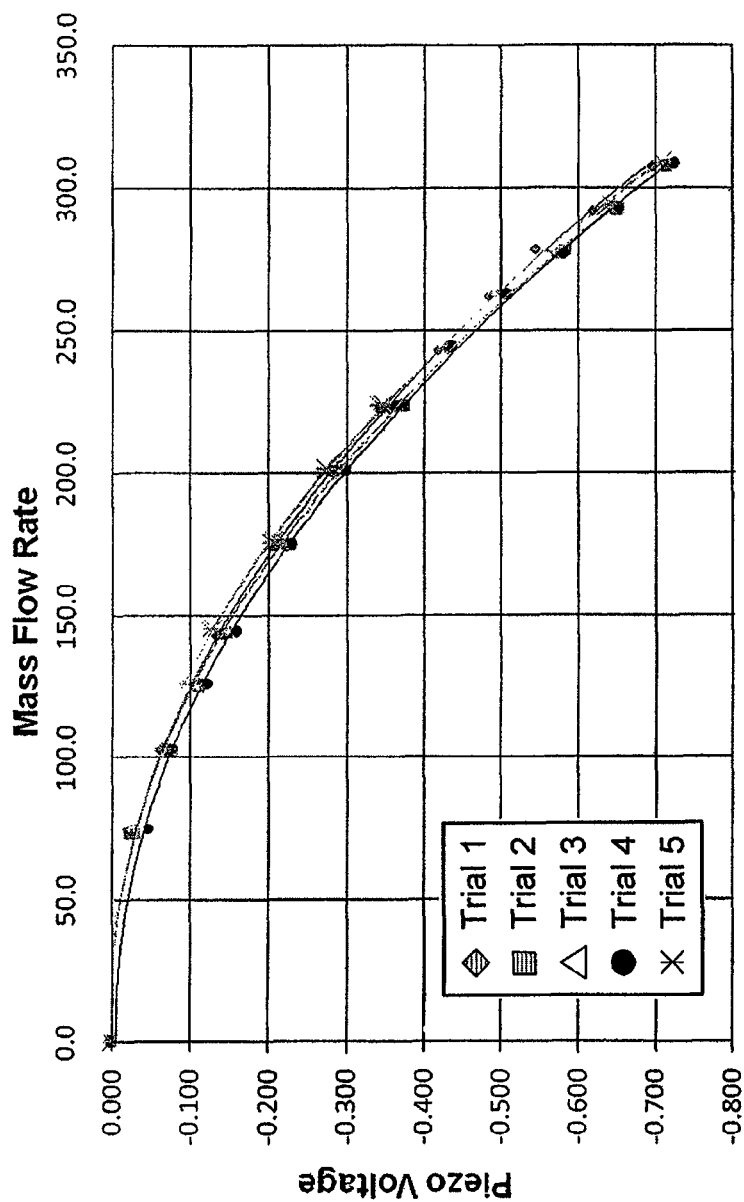
FIG. 10 is an exemplary chart illustrating repeatability data associated with the exemplary force sensor.

Subsequent to the characterization described above, sensor repeatability was investigated. The test methodology was substantially the same, but the sensor orientation was changed between trials to determine whether orientation has a significant effect on response as is the case with thermal mass flow controllers. FIG. 10 illustrates repeatability data as sensor output voltage (in Volts) is shown as a function of mass flow rate (lbs/hr). While there is some variation in output between trials, this variation is very small and can be corrected, if needed.

As described above, the force sensor 10 may be used as a mass flow sensor. It is expected that the mass flow market can accommodate new and advanced flow meters. The market demands accurate, affordable, and robust mass flow sensors. The above described piezo sensor technology will be highly competitive in both traditional markets and future markets. Note that mechanical amplification of force affords the flow sensor increased flexibility to measure a wide range of flow rates and a high turndown ratio without the need to resort to electronic amplification of the output signal. Furthermore, initial tests show that the new sensor may not need any advanced signal conditioning. This is expected to result in significant cost savings and increased competitiveness of the force sensor 10.

The sensor 10 offers the opportunity for a wide range of flow rates, a small form factor, high temperature capabilities, low cost, and extremely low power consumption, since the sensing element does not require input power.

Although the invention has been shown and described with respect to one or more exemplary embodiments, it is appreciated that alterations and modifications may occur to others skilled in the art upon reading and understanding the specification and the annexed drawings without departing from the precepts involved herein. It is intended that all matter contained in the foregoing description shall be interpreted as illustrative and not in a limiting sense. In addition, while a particular feature may have been described with respect to only one or more several illustrated embodiments, such feature may be combined with one or more other features of the other embodiments, as may be desired and advantageous for any given or particular application.

What is claimed is:

1. A force sensor comprising:
a support element coupled to a resilient deflectable portion and at least one pivotable arm portion extending from the resilient deflectable portion; and
a force sensing element having a first end and a second end, wherein the force sensing element is supported at the first end by the support element and operably coupled at the second end through the resilient deflectable portion to the at least one pivotable arm portion, wherein the force sensing element outputs a signal that is proportional to a force applied to the at least one pivotable arm portion.

2. The force sensor of claim 1, wherein the force sensing element, the support element, the resilient deflectable portion and the at least pivotable arm portion are configured to provide mechanical amplification of the force imparted on the at least one pivotable arm that results in an electrical amplification of the output signal of the force sensing element.

3. The force sensor of claim 1, wherein the force sensing element is at least one selected from the group consisting of a piezoelectric material, a piezoresistive material and/or a magnetorestrictive material.

4. The force sensor of claim 1, further including a fluid passage member coupled to the at least one pivotable arm portion, wherein the fluid passage member includes a fluid inlet port, a fluid outlet port and a fluid passageway between the fluid inlet port and the fluid outlet port.

5. The force sensor of claim 4, wherein the fluid inlet port and the fluid outlet port are located on a common surface of the fluid passage member.

6. The force sensor of claim 4, wherein the fluid inlet port and the fluid outlet port are located on opposing surfaces of the fluid passage member.

7. The force sensor of claim 4, wherein the fluid inlet port is located on a first surface and the fluid outlet port is located on a second surface, wherein the first surface and the second surface are orthogonal to each other.

8. The force sensor of claim 4, wherein the fluid passageway includes at least one bend having an angle of substantially about 90 degrees.

9. The force sensor of claim 4, wherein the fluid passageway includes at least one bend having an angle less than 90 degrees.

10. The force sensor of claim 4, wherein the fluid passageway includes at least one bend having an angle greater than 90 degrees.

11. The force sensor of claim 1, wherein the at least one pivotable arm includes a fluid inlet port, a fluid outlet port and a fluid passageway formed within the arm between the fluid inlet port and the fluid outlet port.

12. The force sensor of claim 11, wherein the fluid inlet port and the fluid outlet port are located on a common surface of the at least pivotable arm.

13. The force sensor of claim 11, wherein the fluid inlet port and the fluid outlet port are located on opposing surfaces of the at least pivotable arm.

14. The force sensor of claim 11, wherein the fluid inlet port is located on a first surface and the fluid outlet port is located on a second surface, wherein the first surface and the second surface are orthogonal to each other.

15. The force sensor of claim 11, wherein the fluid passageway includes at least one bend having an angle of substantially about 90 degrees.

16. The force sensor of claim 11, wherein the fluid passageway includes at least one bend having an angle less than 90 degrees.

17. The force sensor of claim 11, wherein the fluid passageway includes at least one bend having an angle greater than 90 degrees.

18. The force sensor of claim 11, wherein the fluid passage member includes a plurality of fluid inlet ports.

19. The force sensor of claim 18, wherein the fluid passage member includes a plurality of fluid outlet ports.

20. The force sensor of claim 11, wherein the fluid is at least one selected from the group of air or a gas.

21. A method for measuring force, the method comprising:
receiving a force on at least one pivotable arm extending from a resilient deflectable structure;
generating an output signal from a force sensing element having a first end and a second end, wherein the force sensing element is supported at the first end by the support element and operatively coupled at the second end through the resilient deflectable structure to the at least one pivotable arm through a resilient deflectable element, wherein the force sensing element outputs an output signal that is proportional to a force applied to the at least one pivotable arm portion.

22. The method of claim 21, wherein the step of generating an output signal includes the received force imparting mechanical stress to the force sensing element through the at least one pivotable arm, the resilient deflectable element and the support element.

23. The method of claim 21, further including correlating the force applied to the at least one pivotable arm portion to a fluid flow rate.

24. A method for measuring fluid flow, the method comprising:
receiving fluid at a fluid inlet port of a fluid passageway, wherein the fluid passageway is coupled to a pivotable arm extending from a resilient deflectable structure of a support element;
routing the received fluid from the fluid inlet port through a fluid passageway for output through a fluid outlet port; and
generating an output signal from a force sensing element having a first end and a second end, wherein the force sensing element is supported at the first end by the support element and operatively coupled at the second end through the resilient deflectable structure to the at least one pivotable arm, wherein the output signal generated by the force sensing element is proportional to a net force associated with a flow of the received fluid from the fluid inlet port through the fluid passageway and output through the fluid outlet port.

25. The method of claim 24, wherein the step of generating an output signal includes the received fluid imparting mechanical stress to the force sensing element through the at least one pivotable arm and the support structure.

26. The method of claim 24, wherein the net force corresponds to a fluid flow rate.

27. The method of claim 24 further including converting the output signal to a flow rate.

28. A force sensor comprising:
a support element coupled to a resilient deflectable portion and at least one arm pivotably mounted to the support element; and
a force sensing element having a first end and a second end, wherein the force sensing element is supported by at the first end by the support element and operatively coupled at the second end through the at least one arm pivotably mounted in such a manner to generate sufficient leverage between the force sensing element and the at least one arm to generate an output signal within a suitable range that corresponds to the applied force without electrical amplification of the output signal.

* * * * *